Patented Nov. 7, 1939

2,178,640

UNITED STATES PATENT OFFICE 2,178,640

MANUFACTURE OF HYDROGEN PEROXIDE

John C. Michalek and Edward C. Soule, Niagara Falls, N. Y., assignors to The Mathieson Alkali Works, Inc., New York, N. Y., a corporation of Virginia No Drawing. Application December 29, 1938, Serial No. 248,251

7 Claims. (Cl. 23—207)

Our invention relates to improvements in the manufacture of hydrogen peroxide by cyclic oxidation and reduction of an intermediate in a solvent in which hydrogen peroxide is of limited solubility, the hydrogen peroxide being separated from the solution of the intermediate following oxidation with an oxygen-containing gas and the intermediate then being regenerated by reduction for re-use.

This general process, using hydrazo benzenes as the reduced intermediates subjected to oxidation, has been well established. The hydrazo benzenes so used have included hydrazo benzene, specifically, and amino substituted hydrazo benzenes. The amino substituted hydrazo benzenes have a much higher rate of oxidation than hydrazo benzene, but other characteristics of these amino substituted compounds have made it impossible completely to realize in a practical way upon this high reaction rate. For example, solutions of high concentration of the amino substituted compounds in benzene tend to form, with hydrogen peroxide or with water or with caustic soda solutions, emulsions which are not readily separated, and this tendency involves loss of material and expense of recovery which become prohibitive from the practical standpoint. Using the amino substituted compounds in low concentration, it is possible to limit such losses to 1% or 2% of the intermediate per cycle, but this course involves the handling of liquid volumes large with respect to the hydrogen peroxide production, which is also expensive. Unlike the amino substituted compounds, hydrazo benzene can be used in concentrations approaching its solubility, in benzene for example, but its rate of oxidation may approximate 1/100, sometimes 1/1000, of the rate of oxidation of amino substituted hydrazo benzenes similarly used. Thus, because of the time required for the oxidation, the liquid volumes to be handled, as related to the hydrogen peroxide production, are also large with this intermediate. The period of time required for the oxidation at such low rates also tends to increase the losses of hydrogen peroxide through decomposition and thus to decrease the chemical efficiency of the operation.

We have found a specific intermediate, namely para-hydrazo-toluene, which has a high rate of oxidation, comparing favorably with those of the amino substituted hydrazo benzenes, and which can be used in high concentration, concentrations comparing favorably with those possible using hydrazo benzene. The use of this intermediate also has several other advantages. Ortho-hydrazo-toluene and meta-hydrazo-toluene have the low rate of oxidation characteristic of hydrazo benzene.

Using para-hydrazo-toluene in solution in benzene in concentrations ranging from 6.8% at 42° C. to 15% at 60° C., we have secured productions of hydrogen peroxide per gram of para-hydrazo-toluene per hour of oxidation ranging from about 0.02 to as much as 0.06 gram and productions of hydrogen peroxide per liter of solution per hour of oxidation ranging from about 1.1 to as much as 8.0 grams with losses of less than 0.1% of the para-hydrazo-toluene per cycle.

Using hydrazo benzene in solution in benzene in similar concentrations, ranging from 7.3% at 25° C. to 14.8% at 42° C., the production of hydrogen peroxide per gram of para-hydrazo-toluene per hour of oxidation approximates 0.0035–0.0055 gram and the production of hydrogen peroxide per liter of solution per hour of oxidation approximates 0.24–0.85 gram with losses of less than 0.25% of the hydrazo benzene per cycle.

Using para-hydrazo-toluene in solution in benzene in a concentration of 3.2% at 25° C., we have secured productions of hydrogen peroxide per gram of para-hydrazo-toluene per hour of oxidation approximating 0.016 gram and productions of hydrogen peroxide per liter of solution per hour of oxidation approximating 0.44 gram. Using ortho-hydrazo-toluene and meta-hydrazo-toluene in solutions in benzene in concentrations of 3.5% at 25° C. the production of hydrogen peroxide per gram of intermediate per hour of oxidation approximates 0.007 and 0.004 gram, respectively, and the production of hydrogen peroxide per liter of solution per hour of oxidation approximates 0.08 and 0.04 gram, respectively.

Using the intermediate of our invention, namely para-hydrazo-toluene, a higher rate of oxidation can be had than with either hydrazo benzene or ortho-hydrazo-toluene or meta-hydrazo-toluene whether the comparison is made in terms of the weight of intermediate or in terms of the volume of solution. As compared to the amino substituted hydrazo benzenes, although the rate of oxidation in terms of weight of intermediate is lower using the para-hydrazo-toluene, the rates of oxidation in terms of volume of solution are of the same order with any concentration of the amino substituted hydrazo benzenes sufficiently limited to avoid impractical losses.

The intermediate of our invention, namely para-hydrazo-toluene, need suffer but little if any chemical deterioration in use in the process, the para-hydrazo-toluene and its corresponding oxidation product having chemical stability of a high order with respect to the conditions of the process.

One of the important advantages of our invention is its capacity to render negligible the losses of intermediate per cycle in the process. This advantage particularly is illustrated in the following examples of embodiments of our invention. It will be noted that in the first example the losses of the intermediate aggregated but 0.06% per cycle and that in the second example the losses of intermediate and solvent aggregated but 0.11% per cycle. In the first example, a volatile solvent permitting easy separation of the intermediate was used, whereas in the second example a non-volatile solvent was used, making it possible to determine loss of intermediate separately from loss of solvent in the first example rather than as a combined loss as in the second example.

EXAMPLE I

A solution of 50 grams of para-azo-toluene in one liter of benzene was agitated with a liquid sodium amalgam and a proportion of water limited to maintain an emulsion of water-in-oil type until the reduction was complete, for about 45 minutes, at 35° C. The amalgam and the aqueous caustic soda solution were separated by decantation, and the para-hydrazo-toluene solution in benezene was washed with water and then filtered through paper to remove traces of water and caustic soda. This para-hydrazo-toluene solution in benzene was then blown with oxygen in the presence of water until the oxidation was complete, about 7 hours, at 35° C. The aqueous solution of hydrogen peroxide formed was separated by decantation. The concentration of this solution was controlled by regulating the amount of water present during the oxidation. The paper through which the reduced benzene solution was filtered, and the oxidation apparatus after return of the oxidized benzene solution to the reduction apparatus, were washed with benzene and this wash benzene, together with any additional benzene necessary to maintain the original volume, that is to replace benzene lost by evaporation during the oxidation, was added to the para-azo-toluene solution in benzene. After separation of the hydrogen peroxide, the para-azo-toluene was again reduced with sodium amalgam in a repetition of the cycle. At the end of ten cycles, the total loss of para-hydrazo-toluene was but 0.28 gram. Further, the melting point of the para-hydrazo-toluene at the end of ten cycles was the same as at the beginning of the operation, namely 142° C. The yields and oxidation rates for each of the ten cycles are given in the following table:

Table 1

| Cycle | Theoretical yield grams $H_2O_2$ | Actual yield percent of theory | Concentration recovered $H_2O_2$ | Gms. $H_2O_2$ per gram intermediate per hour | Gms. $H_2O_2$ per liter solution per hour |
|---|---|---|---|---|---|
| 1 | 8.095 | 92.17 | 28.4 | .0213 | 1.06 |
| 2 | 8.095 | 86.56 | 27.0 | .020 | 1.00 |
| 3 | 8.095 | 81.5 | 26.6 | .019 | .93 |
| 4 | 8.095 | 86.3 | 27.9 | .020 | 1.00 |
| 5 | 8.035 | 91.2 | 30.4 | .021 | 1.04 |
| 6 | 7.81 | 90.3 | 14.5 | .021 | 1.01 |
| 7 | 8.075 | 88.6 | 30.0 | .021 | 1.03 |
| 8 | 8.075 | 88.2 | 27.6 | .020 | 1.02 |
| 9 | 8.055 | 88.25 | 30.9 | .020 | 1.02 |
| 10 | 8.055 | 89.56 | 30.7 | .021 | 1.04 |

EXAMPLE II 1700 cubic centimeters of an 8% solution of para-azo-toluene in 1,1 di-para-tolyl ethane was agitated with a liquid sodium amalgam and about 250 cubic centimeters of water until the reduction was complete. The mixture was agitated to maintain a water-in-oil type emulsion and the amalgam itself was agitated to maintain the concentration of sodium at the surface of the amalgam in contact with the emulsion. The para-hydrazo-toluene solution was then separated from the amalgam and the aqueous solution of caustic soda by decantation and the separated para-hydrazo-toluene solution was washed with an aqueous solution of sodium chloride, or better of sodium sulphate, and then filtered through paper to remove traces of water and caustic soda. The para-hydrazo-toluene solution was then blown with oxygen in the presence of sufficient water to produce hydrogen peroxide solutions of about 30%–35% concentration until the oxidation was complete at 60° C. The aqueous solution of hydrogen peroxide was then separated by decantation and the solution of the intermediate was washed with water further to recover hydrogen peroxide. After separation of the hydrogen peroxide, the para-azo-toluene in 1,1 di-para-tolyl ethane was again reduced in a repetition of the cycle. The apparatus and the paper through which the reduced solution was filtered were washed with benzene which was then evaporated to recover intermediate and solvent. At the end of nine cycles, the total loss of solvent and intermediate was 15 grams. The yields and oxidation rates for each of the nine cycles are given in the following table:

Table 2

| Cycle | Theoretical yield grams $H_2O_2$ | Actual yield percent of theory | Concentration recovered $H_2O_2$ | Gms. $H_2O_2$ per gram intermediate per hour | Gms. $H_2O_2$ per liter solution per hour |
|---|---|---|---|---|---|
| 1 | 20.8 | 56.7 | 21.4 | .027 | 1.98 |
| 2 | 20.4 | 78.8 | 27.5 | .103 | 7.68 |
| 3 | 20.3 | 86.6 | 30.8 | .089 | 6.68 |
| 4 | 20.2 | 88.5 | 31.8 | .091 | 6.86 |
| 5 | 19.8 | 94.5 | 32.9 | .098 | 7.37 |
| 6 | 19.7 | 96.3 | 34.0 | .100 | 7.52 |
| 7 | 19.5 | 89.5 | 30.8 | .098 | 7.35 |
| 8 | 19.3 | 88.2 | 29.5 | .092 | 6.91 |
| 9 | 19.2 | 90.3 | 31.1 | .094 | 7.07 |

The solvent used in the second example, namely 1,1 di-para-tolyl ethane, is used with particular advantage in conjunction with para-hydrazo-toluene as an intermediate in the process. This solvent specifically and those solvents consisting essentially of at least one hydrocarbon liquid at reaction temperature having the formula

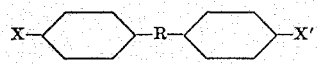

in which R is an alkyl group having no more than 4 carbon atoms and X and X' are hydrogen or the methyl radical have the special advantage of high solvent capacity for para-hydrazo-toluene.

The intermediate of our invention may, however, be used with other solvents. Benzene, as previously noted, is useful as a solvent. Aromatic hydrocarbons containing two benzene nuclei, which are completely saturated with the exception of the benzene nuclei themselves, stable under reacting conditions and liquid at reaction temperature, are advantageous solvents, and of such hydrocarbons those having a vapor pressure lower than about 5 mm. at 100° C. are particularly advantageous. Hydrocarbons having melting points somewhat higher than the reaction temperature may be used in admixture with similar hydrocarbons if the mixture is liquid at the reaction temperature. For example, diphenyl, alkyl substituted diphenyls having comparatively short side chains, and the diphenyl and ditolyl substituted methanes, ethanes, propanes and butanes are useful solvents, singly or in mixtures within the limitation as to liquidity at reaction temperature previously noted.

Mixtures of these various solvents may also be used.

In the foregoing examples reduction and oxidation of the intermediate were carried substantially to completion. In practical operation, it is not necessary to carry either the reduction or the oxidation to completion. Practical purposes are usually served if all but 5% or 10% of the intermediate is reduced and all but 5% or 10% of the intermediate is oxidized in the successive steps of each cycle. Our invention is particularly adapted to continuous operation, as distinguished from batch operation, in that the successive steps in each cycle need not be carried to completion in order to secure good overall efficiency.

The intermediate of our invention, namely para-hydrazo-toluene, has a special advantage in that it permits working at relatively high temperature, and this without involving excessive losses of hydrogen peroxide through decomposition. Such higher temperatures permit increased concentration of the intermediate in the solvent used, reduce the viscosity of the intermediate solution and improve the reaction rate. In this connection it will be noted that yields of as much as 90% and more of theory were recovered in the process of Example II although the oxidation was effected at a temperature of 60° C.

Reduction of the intermediate of our invention is effected with special advantage with sodium amalgam. Sodium amalgam appears to have highly specific valuable properties so used. For example, although substantial proportions of amine compounds are ordinarily formed upon reduction of nitro compounds with sodium amalgam, the production of amine compounds from reduction of para-azo-toluene with sodium amalgam is negligible, amounting in the processes of the two foregoing examples to something less than 0.05% of intermediate per cycle as determined by extraction with hydrochloric acid.

Solutions of the intermediate of our invention, namely para-hydrazo-toluene, particularly in solvents of the class exemplified by 1,1 di-para-tolyl ethane, also have the advantage of being substantially insoluble in and substantially immiscible with water and aqueous solutions of caustic soda. Centrifuging will usually readily remove all aqueous material from the intermediate solution and all of the intermediate solution from aqueous material. All trace of caustic soda, following reduction, can be readily eliminated by water washing after centrifugal separation of the bulk of the aqueous material. The separation may of course be otherwise effected, for example by decantation followed by filtration as in the foregoing examples.

We claim:

1. In the manufacture of hydrogen peroxide by cyclic oxidation and reduction of an intermediate in a solvent in which hydrogen peroxide is of limited solubility, the improvement which comprises using para-hydrazo-toluene as the reduced intermediate subjected to oxidation.

2. In the manufacture of hydrogen peroxide by cyclic oxidation and reduction of an intermediate in a solvent in which hydrogen peroxide is of limited solubility, the improvement which comprises using para-hydrazo-toluene as the reduced intermediate subjected to oxidation in a solvent consisting essentially of 1,1 di-para-tolyl ethane.

3. In the manufacture of hydrogen peroxide by cyclic oxidation and reduction of an intermediate in a solvent in which hydrogen peroxide is of limited solubility, the improvement which comprises using para-hydrazo-toluene as the reduced intermediate subjected to oxidation in a solvent consisting essentially of at least one hydrocarbon liquid at reaction temperature having the formula

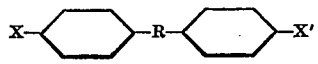

in which R is an alkyl group having not more than four carbon atoms and X and X' are hydrogen or the methyl radical.

4. In the manufacture of hydrogen peroxide by cyclic oxidation and reduction of an intermediate in a solvent in which hydrogen peroxide is of limited solubility, the improvement which comprises using para-hydrazo-toluene as the reduced intermediate subjected to oxidation in a solvent consisting essentially of at least one aromatic hydrocarbon containing two benzene nuclei stable under reacting conditions and liquid at reaction temperature and having a vapor pressure lower than about 5 mm. at 100° C.

5. In the manufacture of hydrogen peroxide by cyclic oxidation and reduction of an intermediate in a solvent in which hydrogen peroxide is of limited solubility, the improvement which comprises using para-hydrazo-toluene as the reduced intermediate subjected to oxidation in a solvent consisting essentially of at least one aromatic hydrocarbon stable under reacting conditions and liquid at reaction temperature.

6. In the manufacture of hydrogen peroxide by cyclic oxidation and reduction of an intermediate in a solvent in which hydrogen peroxide is of limited solubility, the improvement which comprises using para-hydrazo-toluene as the reduced intermediate subjected to oxidation and effecting the reduction with sodium amalgam.

7. In the manufacture of hydrogen peroxide by cyclic oxidation and reduction of an intermediate in a solvent in which hydrogen peroxide is of limited solubility, the improvement which comprises using para-hydrazo-toluene as the reduced intermediate subjected to oxidation and stopping the oxidation and the reduction in the successive steps of the cycle prior to completion.

JOHN C. MICHALEK.
EDWARD C. SOULE.